United States Patent
Vorobyov et al.

(10) Patent No.: US 9,826,270 B2
(45) Date of Patent: Nov. 21, 2017

(54) CONTENT RECEIVER SYSTEM AND METHOD FOR PROVIDING SUPPLEMENTAL CONTENT IN TRANSLATED AND/OR AUDIO FORM

(75) Inventors: Oleg Vorobyov, Kharkiv (UA); Oleksandr Yegorov, Kharkiv (UA)

(73) Assignee: ECHOSTAR UKRAINE LLC, Kharkov (UA)

( * ) Notice: Subject to any disclaimer, the term of this patent is extended or adjusted under 35 U.S.C. 154(b) by 22 days.

(21) Appl. No.: 14/113,781

(22) PCT Filed: Apr. 27, 2011

(86) PCT No.: PCT/UA2011/000032
§ 371 (c)(1),
(2), (4) Date: Oct. 28, 2013

(87) PCT Pub. No.: WO2012/148369
PCT Pub. Date: Nov. 1, 2012

(65) Prior Publication Data
US 2014/0053223 A1   Feb. 20, 2014

(51) Int. Cl.
| | |
|---|---|
| *H04N 7/173* | (2011.01) |
| *H04N 21/439* | (2011.01) |
| *G10L 13/00* | (2006.01) |
| *H04N 21/2343* | (2011.01) |
| *H04N 21/235* | (2011.01) |
| *H04N 21/485* | (2011.01) |
| *H04N 21/81* | (2011.01) |
| *H04N 21/431* | (2011.01) |

(52) U.S. Cl.
CPC ........... *H04N 21/439* (2013.01); *G10L 13/00* (2013.01); *H04N 21/2355* (2013.01); *H04N 21/234336* (2013.01); *H04N 21/4316* (2013.01); *H04N 21/4856* (2013.01); *H04N 21/8133* (2013.01)

(58) Field of Classification Search
CPC ......... H04N 21/439; H04N 21/234336; H04N 21/2355; H04N 21/4856; H04N 21/8133; H04N 21/4316; G10L 13/00
See application file for complete search history.

(56) References Cited

U.S. PATENT DOCUMENTS 5,943,648 A    8/1999   Tel
7,130,790 B1 * 10/2006  Flanagan et al. ................. 704/2
(Continued)

*Primary Examiner* — Oschta Montoya
(74) *Attorney, Agent, or Firm* — Seed Intellectual Property Law Group LLP

(57) ABSTRACT

Systems and methods utilize a content receiver to provide supplemental content, such as news content, personal content and advertising content, to a user. Received data is formatted as supplemental content by the content receiver based on user preference information stored therein, and the formatted supplemental content is transmitted to a content display device. The supplemental content is provided to the user in addition or as an alternative to video content, and may replace or supplement closed captioning content. The supplemental content may be translated into another language and/or converted into audio signals utilizing the content receiver. Systems and methods also utilize a content receiver to translate data such as text data into another language. Text data may, in addition or alternatively, be converted into audio signals utilizing the content receiver.

17 Claims, 5 Drawing Sheets

(56) References Cited

U.S. PATENT DOCUMENTS

| | | | |
|---|---|---|---|
| 7,669,218 B1* | 2/2010 | Groff | H04N 21/4782 725/51 |
| 2006/0064734 A1* | 3/2006 | Ma | H04N 21/235 725/136 |
| 2006/0168150 A1* | 7/2006 | Naik et al. | 709/219 |
| 2008/0263599 A1* | 10/2008 | Knudson | H04N 21/235 725/50 |
| 2008/0301741 A1* | 12/2008 | Stern et al. | 725/93 |
| 2008/0313697 A1 | 12/2008 | Rajan et al. | |
| 2010/0185434 A1* | 7/2010 | Burvall et al. | 704/3 |
| 2012/0204201 A1* | 8/2012 | Cassidy | H04N 21/258 725/10 |

* cited by examiner

CONTENT RECEIVER SYSTEM AND METHOD FOR PROVIDING SUPPLEMENTAL CONTENT IN TRANSLATED AND/OR AUDIO FORM

FIELD OF THE INVENTION

This disclosure relates generally to providing supplemental content utilizing content receivers, and more specifically to utilizing the content receiver to provide supplemental content in text, translated and/or audio form that is in addition to video content.

SUMMARY

The present disclosure discloses systems and methods for utilizing a content receiver to provide text data as well as supplemental content to a user viewing a content display device coupled to the content receiver. Each of the text data and supplemental content may be translated and/or converted into audio signals utilizing the content receiver.

According to one implementation, a method for providing supplemental content utilizes a content receiver such that the content receiver receives data, which is data in addition to streaming content comprised of video content, audio content and metadata content, the supplemental data selected from the group consisting of text data, data translated from one human language to another, and data converted from text data to audio signals, the supplemental data received in addition to streaming content comprised of video content, audio content and metadata content, and the supplemental data is to be one of displayed on a content display device in addition to video content, displayed on the content display device as an alternative to video content, transmitted as audio signals in addition to the audio content and transmitted as audio signals as an alternative to audio content. The content receiver formats the data as supplemental content based on user preference information stored as metadata associated with the supplemental data in the content receiver, and transmits the formatted supplemental content to a content display device.

In another implementation, a method for providing translated text data involves utilizing a content receiver that receives text data in at least one human language, translates the text data into a second human language different from the at least one human language, where the text data is translated based on user preference information stored as metadata within the content receiver. The content receiver then transmits the translated text data to a content display device.

In another implementation, a method for providing audio signals utilizes a content receiver that receives text data at the content receiver, where the text data includes extended header information. The content receiver converts the text data into audio signals based on the extended header information, and transmits the audio signals to an audio source configured to provide audibly perceptible sound signals.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
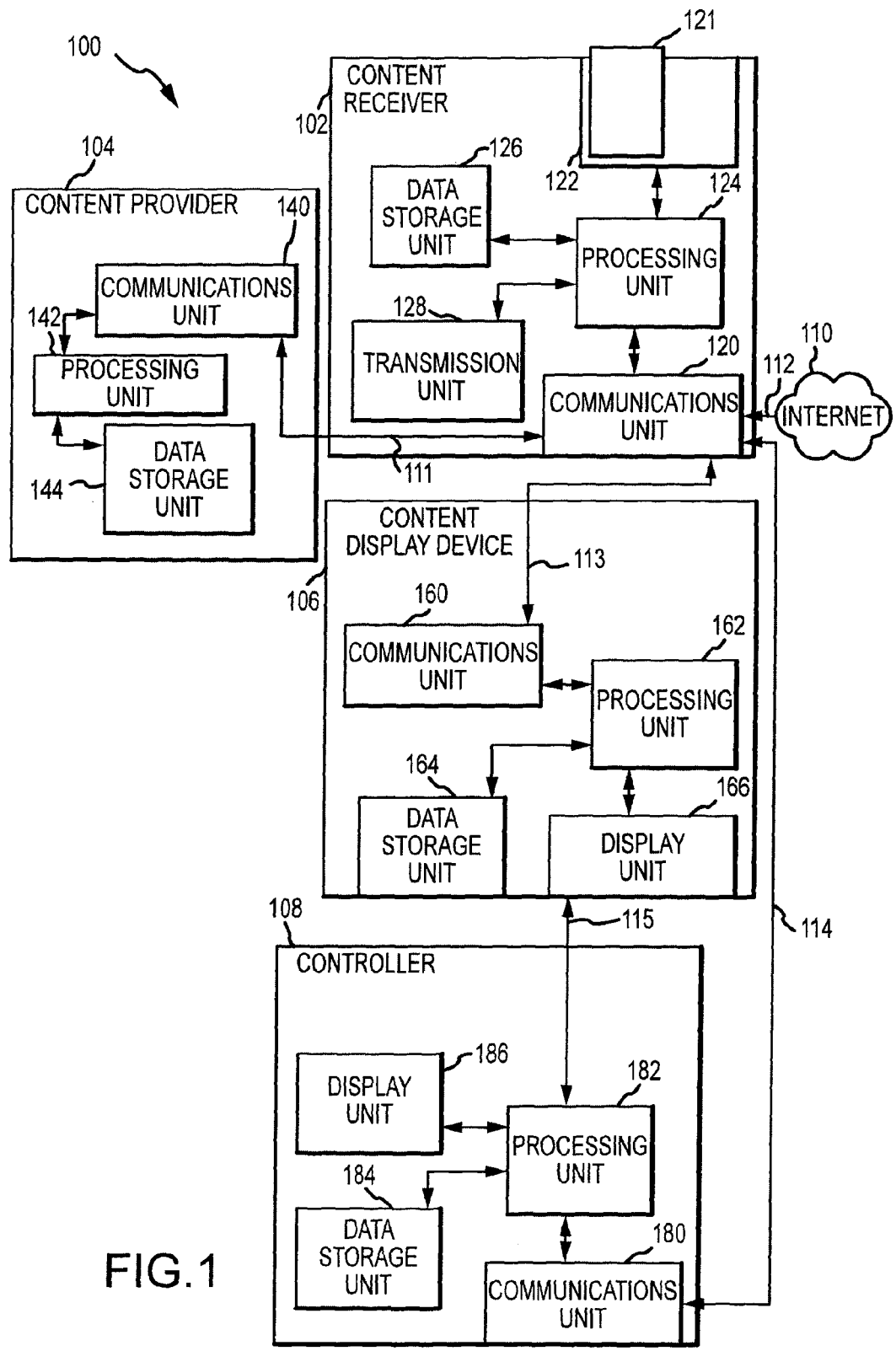
FIG. 1 is a block diagram illustrating a system for providing supplemental content as well as text data, each of which may be translated and/or converted into audio content, utilizing a content receiver.

The description that follows includes sample systems, methods, and computer program products that embody various elements of the present disclosure. However, it should be understood that the described disclosure may be practiced in a variety of forms in addition to those described herein.

Content receivers, including set top boxes, digital video recorders, television receivers such as satellite receivers and cable receivers, generally receive content from a content provider, including satellite programming companies, cable programming companies, and Internet service providers, and the like, for transmission of the content to content display devices, including televisions, and speakers, and so on. Generally, the content transmitted to the content display device is a digital stream provided from the content provider, which includes audio, video, and metadata streams.

The present disclosure discloses systems and methods for the content receiver to receive and transmit supplemental content as well as text data in a format specified by the user and/or the content provider. The supplemental content may be news content (e.g., local, world, regional, sports, weather, and/or financial content), personal content (e.g., e-mail and/or social media account content), advertising content and the like, which is generally content delivered separate or in addition to data commonly within the content stream. A content stream generally includes audio, video and metadata (e.g., programming guide data). Text data may be a type of supplemental content and may include electronic book data, and references to supplemental content may also be text data.

Supplemental content may originate from a content provider, from the Internet or from another external source. For example, a news source may generate a stream of text data relating to news stories and provide the text data to the content provider for transmission to the content receiver. The stream of text data is assigned a process identifier ("PID") associated with the news channel. PIDs are generally identifiers associated with data streams, such as content streams and supplemental data streams, that identify a channel for the data stream. Several PIDs may be associated with one transponder controlled by a content provider, for example. When a channel is selected by the user, e.g., using a controller such as a remote control, the content receiver transmits the data stream having the PID associated with the channel to the content display device. Thus, according to the present disclosure, when the user selects the channel for the news source (e.g., the channel for CNN) with the associated PID, the text data having the matching PID is displayed on the content display device.

In another example, the news source may be communicatively coupled to the content receiver by an Internet connection and may transmit the text data with an assigned PID directly to the content receiver, and the supplemental content may be transmitted to the content display device when the user selects the channel for the news source. In another example, an electronic book connects to the content receiver through an external port and delivers text content directly to the content receiver. The content receiver transmits the electronic book to the content display device upon receiving command signals, such as "read", utilizing a control device such as a remote control, or the electronic book is displayed upon the user selecting a predetermined channel, e.g., a channel associated with a PID assigned to the electronic book data. In another example, the user subscribes to a news service, a book service, a social media service, and the like, and the supplemental content is received at the content receiver based on the user's subscription. In this example, the subscription may be offered by the content provider or by another source and the subscription data may be transmitted to the content receiver. The content source may be assigned a unique PID or may be assigned a PID associated with a programming source (e.g., movie, news, sports, weather channels). For example, the unique PID may be merged with a PID associated with a programming source PID so that when the channel for the programming source is selected, the supplemental content with the merged PID data is displayed in addition to or as an alternative to the programming content.

As described further below, supplemental content may also be generated by the content receiver by utilizing data received therein to retrieve, translate, refresh, and/or update the received data, thereby generating supplemental content.

The user and/or the content provider may select how the supplemental content is displayed on the content display device, e.g., the image location, size, font, color, and so on, and may also select the size and arrangement of the video content on the content display device. The selection data may be stored as metadata associated with the supplemental content. It will be understood that the content receiver may receive and transmit content (e.g., video, audio, and metadata) and the supplemental content simultaneously. It will also be understood that the supplemental content may be transmitted to a content display device instead of or in addition to the closed captioning associated with the video content.

The present disclosure also discloses systems and methods for the content receiver to translate content (e.g., from a content stream or from supplemental content) into a language of the user's choice (e.g., a human spoken/readable language as opposed to a computer language), and transmit the translated content to the content display device. For example, data (e.g., text) signals from the content provider, the Internet or through a device communicatively coupled to the content receiver may be decoded and translated into a language set by the user, and the content receiver may transmit the translated data to a content display device. This is useful where audio or text content (whether supplemental content or digital stream content from the content provider) delivered to the content receiver is not available in a language desirable for or understandable by the user utilizing the content receiver and content display device.

The present disclosure also discloses systems and methods for the content receiver to read text content (e.g., subtitles, text from video content, radio, general text data) and transmit the text content in an audible format utilizing a text-to-audio application. The text-to-audio application is useful, for example, where audio tracks are supplied with video content in a language that does not match the user's native language but subtitle data is provided in the desired language. Where the text data, e.g., in the form of subtitle data, is provided to the content receiver, the processing unit is configured to generate one or more voices in the language desired by the user. In addition or alternatively, the audio content or text content associated with the video stream may not be available in a format (e.g., language) desired by the user, and in this case, the content receiver may translate the audio content or the text content into a language selected by the user and then utilize the text-to-audio application to deliver audio in the user's preferred language.

The content receiver text-to-audio application may also be configured to deliver audio content having different sounds based on the data transmitted to the content receiver. For example, for audio content associated with video content showing a woman talking, the text-to-audio application may read header information associated with the text and generate and provide audio to the content display device speakers that simulate a woman's voice. If the header information associated with the audio content is extended and indicates the woman is speaking using a certain characteristic, e.g., fast/slow and/or loud/soft and/or with intonation, the content receiver text-to-audio application may additionally generate audio to match the characteristics of the woman's voice. The text-to-audio application may also recognize header information associated with generally recognizable speech types, such as the voice (e.g., type and intonation) of famous actors or characters (e.g., cartoon characters).

It will be understood that the audio content generated by the content receiver and provided in an audible format may be in addition or as an alternative to the audio content associated with the video content. For example, supplemental content may be transmitted by the content receiver to the content display device in an audible format, and the volume of the audible supplemental content may be adjusted to a higher or lower volume compared to the audio content associated with the video stream. Allowing the user to control the volume of both the supplemental audio content and the video-associated audio enables a user to control their experience.

FIG. 1 is a block diagram illustrating a system 100 for providing content to a user utilizing a content receiver. The content provided includes supplemental content, and the content or the supplemental content may be translated into another language and/or converted into audio content. The system 100 includes a content receiver 102 (such as a set top box) for receiving and transmitting content (such as television programming) and supplemental content (such as text data), a content provider 104 for transmitting the content (such as a satellite or cable programming service provider), a content display device 106 for receiving and displaying the content (such as a television), a controller 108 (such as a remote control) for transmitting data such as control signals to the content receiver 102, and communication with the Internet 110.

The content receiver 102 is a device for receiving content from the content provider 104, the Internet 110 and other external sources, for processing or decoding the content and for transmitting the content to the content display device 106. The content receiver 102 is, for example, a set top box, a television receiver, a digital video recorder, a computing device, a gaming device, or a television, which is located at a user's location (such as a user's residence or business). The content receiver 102 is operable to receive content from the content provider 104 by way of the transmission link 111, and from the Internet 110 by way of the transmission link 112. Each of the content provider 104 and the Internet 110 provides content in the form of data that is received by the communications unit 120 of the content receiver 102. The content receiver 102 is also operable to receive content from an external source 121 by way of data port 122 (e.g., USB port). For example, the data port 122 may be a USB port connectable to a flash drive, a mobile computing device such as a phone (e.g., a smart phone and/or a camera phone), a digital book, and the like. The data from the content provider 104, the Internet 110 and the external source 121 is provided to the processing unit 124 for executing instructions stored in the data storage unit 126 and for providing content to the content display device 106 via the transmission unit 128. The transmission unit is communicatively coupled to the content display device 106 by way of the processing unit 124, the communications unit 120 and the transmission link 113. The processing unit 124 also executes instructions stored in the data storage unit 126 for formatting the received data (e.g., content including audio, video and metadata) and supplemental content. (e.g. supplemental text and/or audio) for display on the content display device 106 based on user preferences, for translating the received data into a selected format (e.g., a selected language) based on user preferences, and for converting data received in the form of text into audio signals. User preference information associated with the supplemental content, text translation and text-to-audio may be stored by the storage unit 126 as metadata in the content receiver and retrieved by the processing unit 124 for formatting. In addition, the supplemental content, text translation data and text-to-audio may be assigned a PID when the data is to be transmitted to the content display device based on the user selecting a channel associated with the PID.

The content provider 104 is generally remotely located from the content receiver 102. The content provider 104 is, for example, a satellite programming company, a cable company, an Internet service provider, e.g., an online video service or Internet video provider, and the like, that uses a communications unit 140 to deliver content and supplemental content to the content receiver 102. The content provider 104 also includes a processing unit 142 for executing instructions stored in the data storage unit 144. The content provider 104 receives, manages and stores content as well as supplemental content and metadata and PIDs associated with the supplemental content that is transmitted from the communications unit 140 to the communications unit 120 of the content receiver 102 via the transmission link 111.

The content display device 106 is generally arranged proximate to and is communicatively coupled to the content receiver 102 and displays content as well as supplemental content from the content receiver 102. While content display device 106 and the content receiver 102 are depicted as separate components in FIG. 1, it will be appreciated that the content receiver 102 may be incorporated with the content display device 106. The content display device 106 is, for example, a television, a computer screen, a video screen, or any other display device for displaying content or images capable of being viewed by a user. The content display device 106 includes a communications unit 160, which receives content from the communications unit 120 of the content receiver 102 by way of the transmission link 113. The content display device 106 also includes a processing unit 162 for executing instructions stored in a data storage unit 164. In addition, the content display device 106 includes a display unit 166 for displaying the content and supplemental content received from the content receiver 102.

The controller 108 is generally provided in an area proximate the content receiver 102 and is communicatively coupled to the content receiver 102 by way of the transmission link 114 and communicatively coupled to the content display device 106 by way of the transmission link 115. The controller 108 is, for example, a remote control, such as a universal remote control, a dedicated remote control, or a computing device programmed to send command signals to the content receiver 102. The controller 108 includes a communications unit 180 for sending and receiving information, a processing unit 182 for executing instructions stored in a data storage unit 184, and an optional display unit 186 for displaying or presenting information stored within the data storage unit 184 such as information related to a command sent to the content receiver 102.

Supplemental content is received by the content receiver 102 from a number of external sources including the content provider 104, the Internet 110 as well as externals sources 121 by way of a data port 122 (e.g., USB port) coupled to the processing unit 124 of the content receiver 102. When the supplemental content is supplied by the content provider 104, the supplemental content is generally additional data separate from a content stream (e.g., video content, audio content and metadata generally associated with a multimedia stream). The supplemental content may include data such as image or text data including but not limited to local, regional and/or world news; local, regional and/or world sports; weather; financials; other current events; personal e-mails; social networking information; and the like.

Supplemental content may also be generated by the content receiver. Utilizing the content receiver, data received from an external source may be converted (e.g., into audio signals), translated, updated and/or refreshed, thereby converting the received data into supplemental content. For example, the content receiver 102 may be configured to separate text data from video content (e.g., text data for phone numbers, advertising details, breaking news content may be separated from the video content), execute instructions for retrieving updated or refreshed information, and transmit the updated text data to the content display device 106 concurrently with the video content. In another implementation, the supplemental content may be received at the content receiver 102 prior to the video content and the content receiver 102 may retrieve updated information related to the supplemental content while at the same time receiving the video content. In this implementation, the content receiver 102 may also transmit the updated supplemental content information to the content display device 106 concurrently with the video content. In another example, the content receiver 102 differentiates supplemental text data according to geographic region (e.g., according to zip code, area code, city, country, region), according to user parameters (e.g., the age, subscription package, demographic, education of the user), according to content receiver 102 parameters (e.g., viewing statistics, language selected) and retrieves supplemental content according to the specified location, user or content receiver characteristics. Providing the content receiver 102 with the ability to retrieve updates for the supplemental content enables the user to be provided with up-to-date (e.g., near real-time), customized, and/or user-defined supplemental content from a variety of sources. The data retrieved by the content receiver 102 may be data stored in the data storage unit 126 or may be data retrieved from an external source such as from the content provider 104, the Internet 110, or from information received by way of data port 122.

Moreover, even where supplemental content is provided to the content receiver 102 by an external source, the supplemental content may be converted into another form of supplemental content by the content receiver 102. For example, supplemental content received by the content receiver 102 may be provided in one language, e.g., English, and the content receiver 102 may translate and format the data into another language selected by a user, e.g., Russian, Spanish, French, Italian, Chinese, Japanese, and the like. In another example, supplemental content in the form of text data may be converted by the content receiver 102 into supplemental audio content. In yet another example, content provided in the form of video subtitles with extended header information may be converted by the content receiver 102 into supplemental audio content in which the audio signals have certain sound characteristics (e.g., man, woman, child, soft/loud, fast/slow, intonation) based on the header information.

In connection with the content receiver 102 translating text data from one language (e.g., English) to another language (e.g., Russian), the processing unit 124 executes instructions stored in data storage unit 126 for language translation, executes instructions for the communications unit 120 to communicate with and obtain translated text data from an instant translation service accessible via the Internet or through a network connection, or a combination of two or more of these methods. In addition, the processing unit 124 may execute instructions to download translation software or updates into the data storage unit 126 for use in text data translation. The real-time or near real-time translation of the text data may be useful in applications where a multimedia stream or supplemental content stream provides text data in one or more languages that is not the preferred language of the user utilizing the content receiver 102.

In one implementation, the content receiver 102 may translate text data upon receipt of subtitles associated with video content and may execute instructions for translating the subtitles into another language. This translation may occur in real-time such that the translated subtitles are displayed with the video content simultaneously. In some implementations, a lag may result from executing the translation process, and the processing unit may temporarily pause the video content in order to synchronize transmission of the translated subtitles with the video content. In another implementation, the content receiver 102 receives supplemental content in the form of text data and translates the text data for subsequent display on the content display device 106, which may or may not be synchronized with video content. In some implementations, a user is presented with a menu of choices for translating the text data, which is described further below in connection with FIG. 3. In addition or alternatively, the content provider 104 may instruct the content receiver 102 to automatically translate subtitles received in any language (other than a pre-set language) to the pre-set language. For example, the pre-set language may be the language associated with the geographic area where the content receiver 102 is located.

In connection with the content receiver 102 converting text data such as subtitles into audio signals, the processing unit 124 may be configured to recognize header information associated with the text data. Header information is generally a time stamp indicating a time when the text is to be displayed with video content, and/or when text data converted into audible signals is to be transmitted to speakers. According to certain embodiments, the header information is extended. This extended header information provides data related to characteristics of the text data to be converted into audio signals in addition to a time stamp. For example, the extended header information additionally includes information about the type, speed, intonation and/or accent of the text data to be converted into audio signals. It will be understood that the extended header information may be provided along with the text data (e.g., subtitles) from the content provider or the entity providing the video or audio content (e.g., a production company).

As the text data is converted into audible signals, the extended header information is recognized and utilized by the processing unit 124 to supplement the audible signals by, for example, providing the audible signals that are generally perceptible as a type of voice, e.g. male, female, child, elderly, cartoon; and/or providing a speed to the audio signals, e.g., fast, slow, stuttered; and/or providing intonation to the audio signals, e.g., pitch variation; and/or providing audio signals with accents customary to a spoken language. The processing unit 124 may be configured to read the header information and generate audio signals having incorporated at least one or more of the features provided in the extended header information. It will be understood that the extended header information may be provided in connection with text data such as subtitles, and such text data may be translated, utilizing the content receiver 102, into a language chosen by the user.

Where the content receiver 102 is programmed to provide only certain audible features, e.g., type and speed of speech, but not intonation, the processing unit 124 is signaled by the header to ignore the non-applicable intonation header information and the processing unit 124 converts the text data into audible signals based on its capabilities. This allows extended header information to be received by any content receiver 102 regardless of the capabilities of the text-to-audio application of the content receiver 102. Alternatively, where the content receiver 102 encounters unrecognized header information, the processing unit 124 may execute instructions for the communications unit 120 to check for updates to determine whether additional code is available for download in order to enable the processing unit 124 to convert the text data into audio signals based on each of the features associated with the extended header data.

Figure 2:
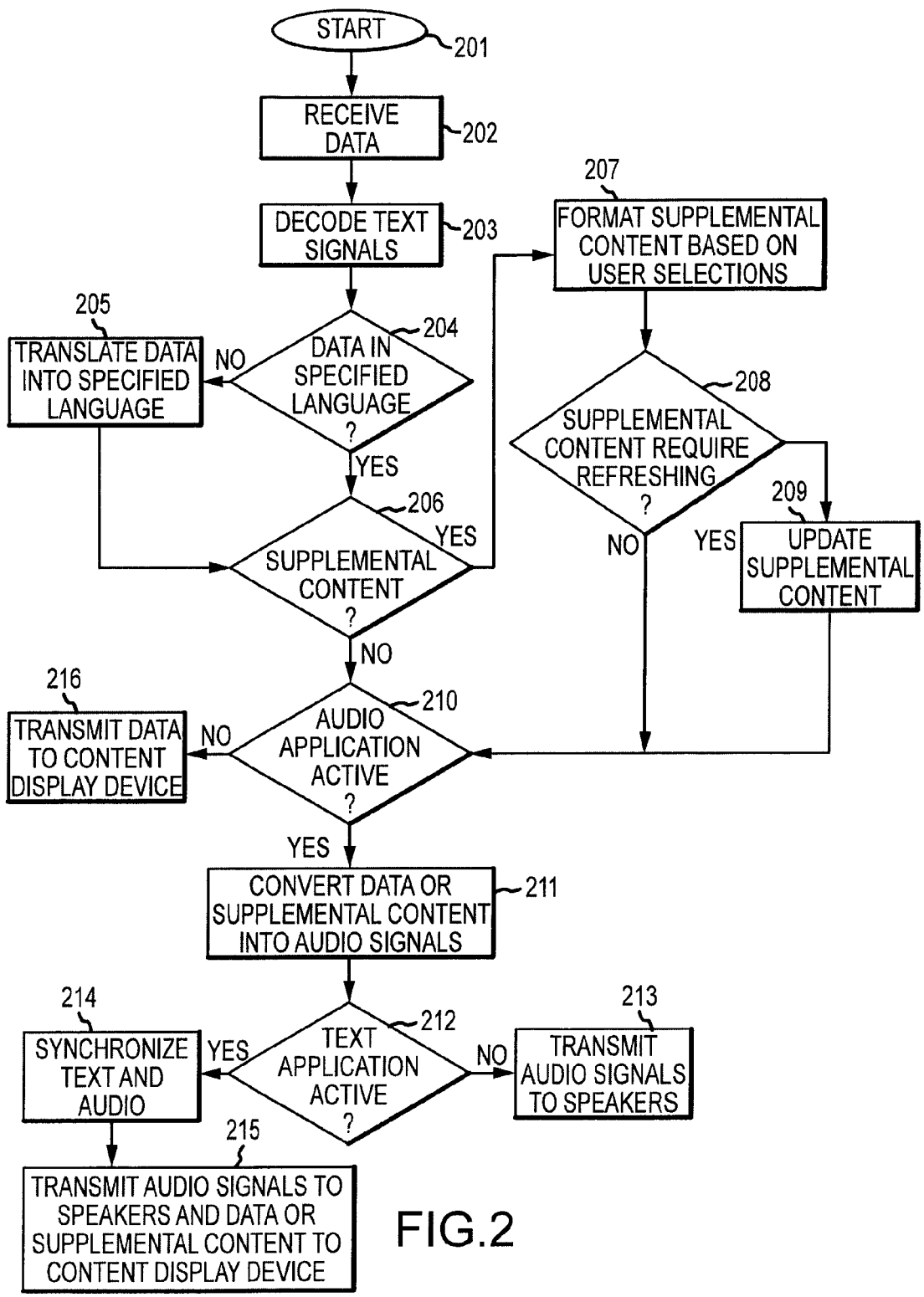
FIG. 2 is a flow chart illustrating a method for providing supplemental content as well as text data, each of which may be translated and/or converted into audio content, utilizing a content receiver. This method may be performed by the system of FIG. 1.

FIG. 2 illustrates a method 200 for providing content to a user utilizing a content receiver. The content provided includes supplemental content, which may be translated and/or converted into audio content. The method 200 may be performed by the electronic device content receiver 102 of FIG. 1. The flow begins at block 201 and proceeds to block 202 where data is received. The flow then proceeds to block 203 where text signals from the received data are decoded utilizing the processing unit 124. The flow then proceeds to block 204 where the processing unit determines whether or not the decoded text signals are in a language specified by the user (e.g., the set top box operator or the content provider). If not, the flow proceeds to block 205 where the text signals are translated into the specified language. For example, in connection with block 205, the processing unit 124 may be configured to translate text data from one language (e.g., English) to another language (e.g., Russian) by executing instructions stored in data storage unit 126 for language translation, or by the processing unit 124 executing instructions for the communications unit 120 to communicate with an obtain translated text data from an instant translation service accessible via the Internet or through a network connection.

Where no text translation is needed, the flow proceeds to block 206 where the processing unit 124 determines whether the text signals are supplemental content. If the text data is not supplemental content, the flow proceeds to block 210, described below. Where the text signals are determined to be supplemental content, the flow proceeds to block 207 in which the processing unit 124 formats the supplemental content based on user selections, described in connection with FIGS. 3A-3C below. Upon formatting, the flow proceeds to block 208 where the processing unit 124 determines whether the supplemental content requires refreshing. If refreshing the text data is not required, the flow proceeds to block 210, described below. Otherwise, the flow proceeds to block 209 where the supplemental content is refreshed. For example, the processing unit 124 may execute instructions for the communications unit 120 to query a website to obtain updated text information such as updated news content (up-to-date news, sports scores, stock prices, and the like) or updated advertising content (e.g., business name, phone number, location (e.g., address).

At block 210, the processing unit 124 determines whether an audio application is active, e.g. a text-to-audio application. If so, the flow proceeds to block 211 where the text data, whether or not the text data is supplemental content, is utilized by the processing unit 124 to execute instructions for generating audible signals capable of being transmitted to an audio source (e.g., speakers integrated with or coupled to the content display device 106) in a form perceptible to the ear, e.g., perceptible as a voice. When the audio application is active, the flow proceeds to block 212 where the processing unit 124 determines whether the text application is active (e.g., where the content receiver 102 is to transmit both text and audio signals to the content display device 106). If not, the flow proceeds to block 213 where the audio signals are transmitted to the audio source. If both the audio and the text applications are active, the flow proceeds to block 214 where the processing unit 124 executes instructions for synchronizing transmission of the text and the audio, and then executes instructions such that the communications unit 120 simultaneously transmits the audio signals to the audio source and the supplemental content to the content display device 106 at block 215.

At block 210, where the processing unit 124 determines that the audio application is not active, the flow proceeds to block 216 where the text data, whether or not the text data is supplemental content, is formatted for transmission to the content display device 106. For example, when the text data is supplemental content, the supplemental content may be formatted by the processing unit 124 for display on a pre-defined area of the display unit 166 of the content display device 106. The pre-defined area for displaying the supplemental content may be selected by a user from a pull-down menu, described below, and/or may be defined by the content provider.

Figure 3A:
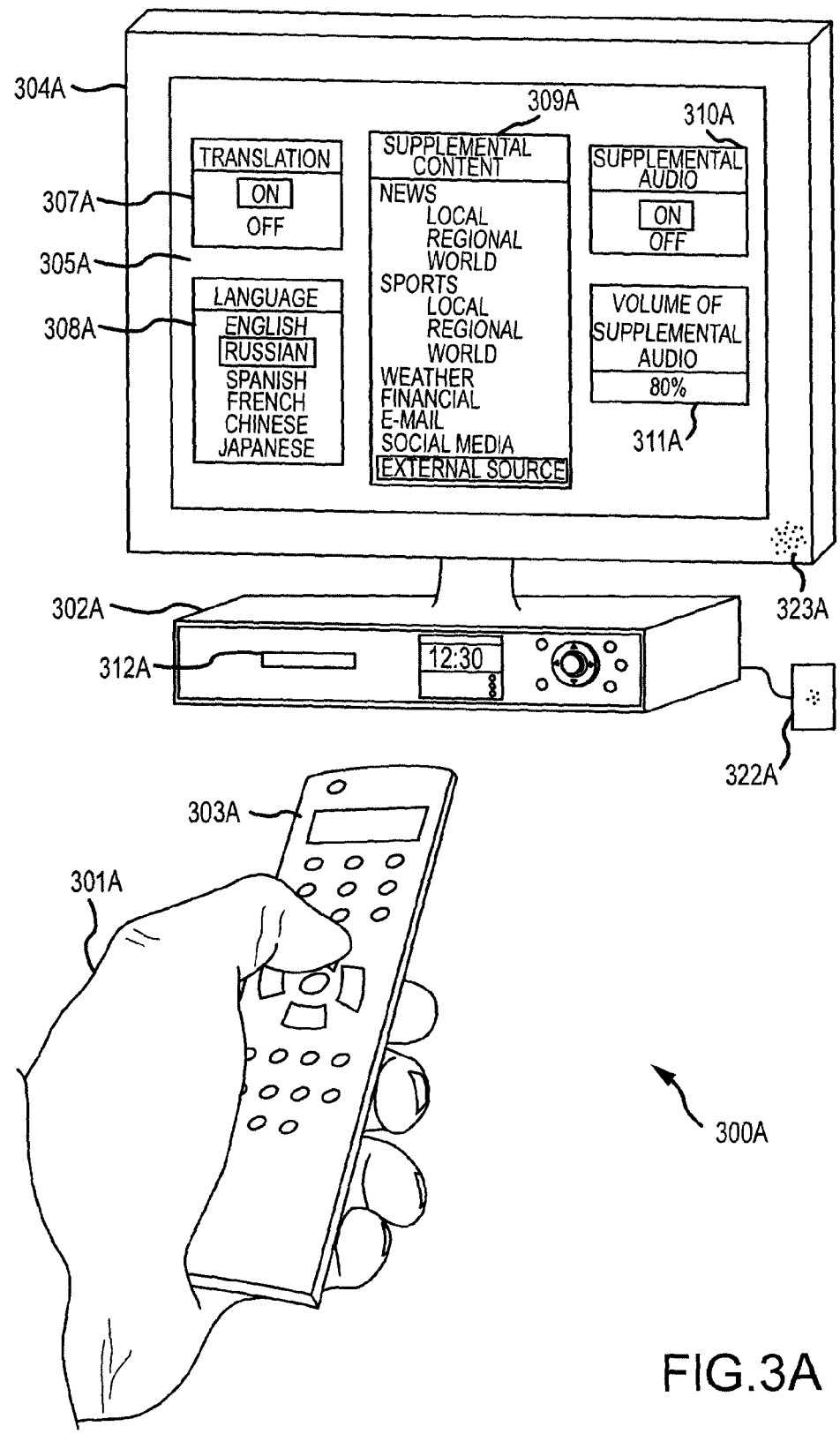
FIGS. 3A-3C are diagrams illustrating a system for providing supplemental content as well as text data, each of which may be translated and/or converted into audio content, to a user utilizing a content receiver. The system may be the system of FIG. 1.
Figure 3B:
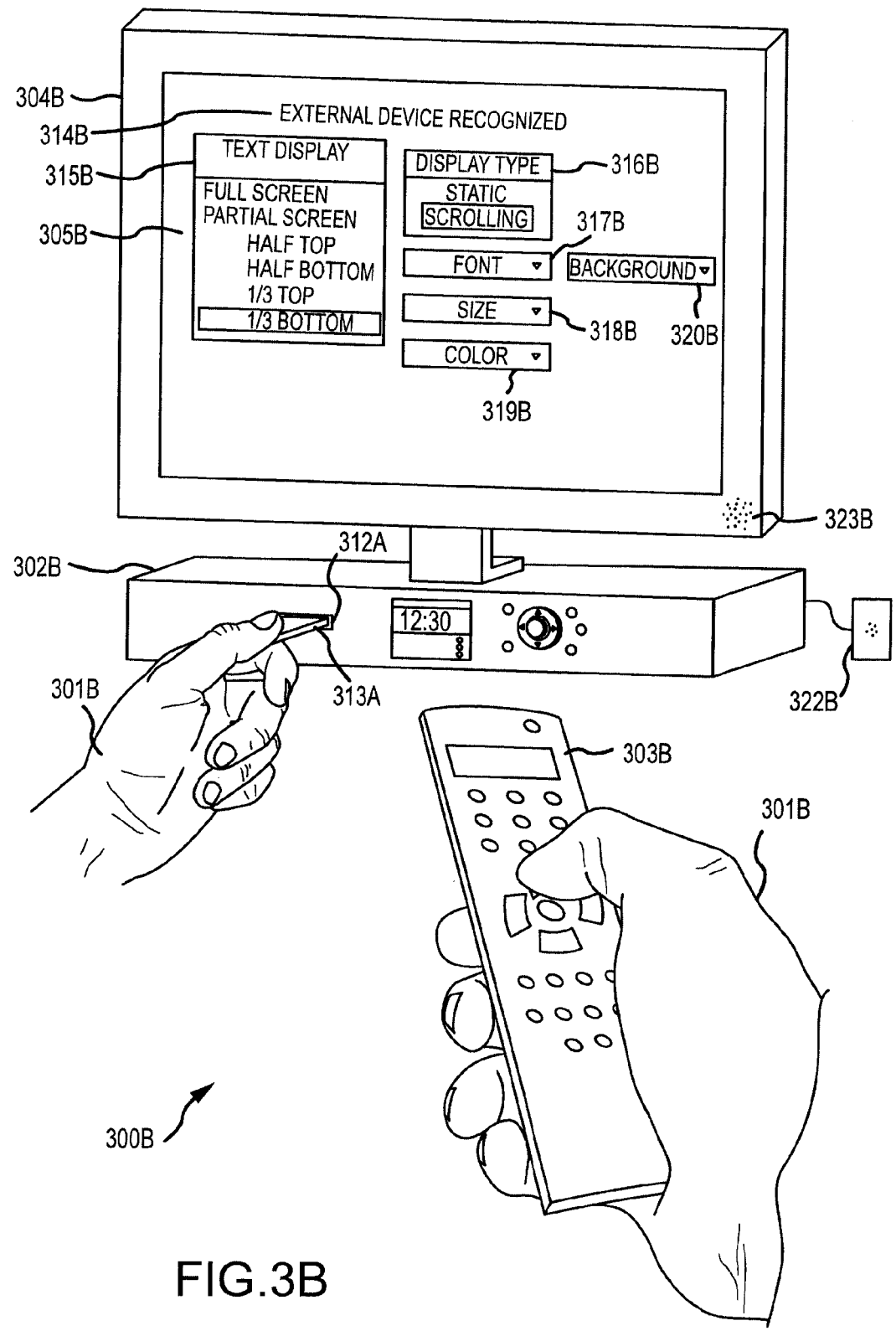
Figure 3C:
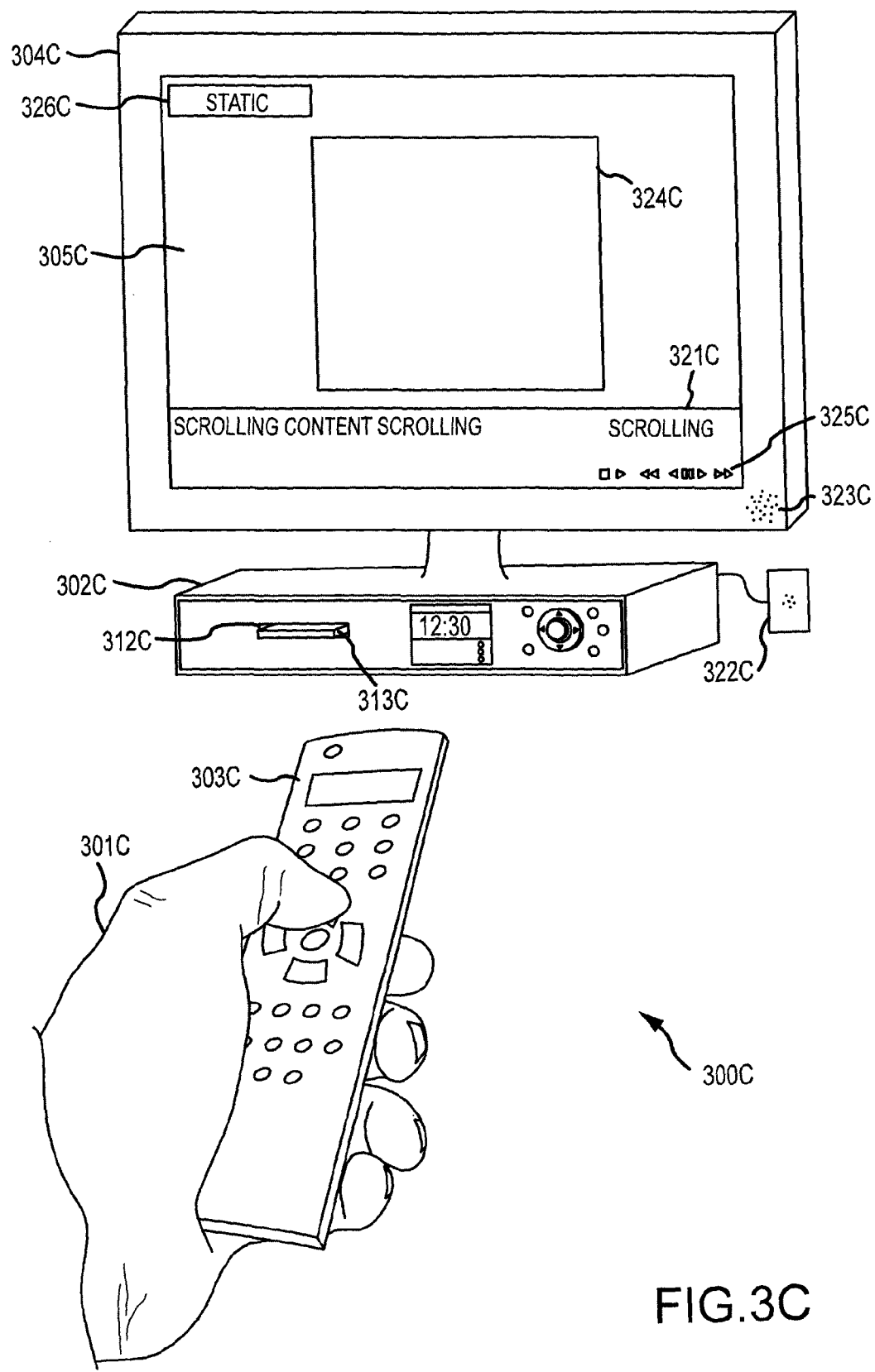

FIGS. 3A-3C illustrate a user 301A-301C utilizing a system 300A-300C for providing supplemental content, which may be translated and/or converted into audio content, to a user utilizing a content receiver. The system 300A-300C may be the system 100 of FIG. 1. As illustrated in FIG. 3A, the user 301A at the content receiver 302A (such as a set top box) utilizes the controller 303A (such as a remote control) to make one or more selections related to the content receiver 302A providing supplemental content. The user 301A viewing the content display device 304A reviews the menu contents displayed on the display screen 305A and selects one or more menu options utilizing the controller 303A. In FIG. 3A, the translation menu 307A provides on and off selections; the language menu 308A provides a number of selectable languages such as English, Russian, Spanish, French, Chinese, Japanese; the supplemental content menu 309A provides a number of supplemental content options such as news, local news, regional news, world news, sports, local sports, regional sports, world sports, weather, financial, e-mail social media, and external source; the supplemental audio menu 310A provides on and off selections; and the volume of the supplemental audio menu 311A provides the user the ability to select a percentage or ratio (e.g., equal to, higher or lower) of supplemental audio to the audio associated with the video content. The user may also select to turn off the audio associated with the video content.

Utilizing the menus illustrated in connection with system 300A of FIG. 3A, for example, the user selects "on" from the translation menu 307A, "Russian" from the language menu 308A, "External Source" from the supplemental content menu 309A, "on" from the supplemental audio menu 310A, and 80% volume from the volume of supplemental audio menu 311A. The supplemental content is provided to the content receiver from an external source by coupling the external source to the data port 312A, as described in connection with FIG. 3B.

FIG. 3B illustrates the user 301B inserting an external data source 313B (such as a thumb drive, a mobile computing device, an electronic book) into the data port 312B of the content receiver 302B. The content receiver 302B receives signals indicating the external data source 313B has been coupled thereto and the content receiver 302B displays a message 314B indicating to the user 301B that the content receiver 302B recognizes the external device connected thereto. For example, the content receiver 302B may provide this indication when it is configured to parse data stored on the external data source 313B, such as data in an e-book format. The content receiver 302B transmits to the content display device 304B a menu of options for the display screen 305B to display, which the user 301B views and utilizes the controller 303B to select options related to how the external content is to be displayed on the content display device 304B. In FIG. 3B, the text display menu 315B provides full screen; partial screen half top, partial screen half bottom, partial screen ⅓ top and partial screen ⅓ bottom selections, the display type menu 316B provides static and scrolling selections; the font menu 317B enables the user to select a text font type; the text size menu 318B enables the user to select the text type size; the color menu 319B enables the user to select the text color; and the background menu 320B enables the user to select the presentation of the background (e.g., the color of the overlay) over which the supplemental text data is presented.

In FIG. 3B, the user selects "⅓ bottom" from the text display menu 315B, "scrolling" from the display type menu 316B, the text font from the font menu 317B, the text size from the size menu 318B, the text color from the color menu 319B, and the background color from the background menu 320B. The user selection information described in connection with FIGS. 3A and 3B is stored in the data storage unit 126 as metadata associated with the supplemental content, which is retrieved by the processing unit 124 for formatting of the supplemental content.

FIG. 3C illustrates the supplemental content displayed on the content display device 304C according to the user 301C selections from the menus depicted in FIGS. 3A and 3B (e.g., menus 307A, 308A, 309A, 310A, 311A, 315B, 316B, 317B, 318B, 319B, 320B). For example, with respect to displaying the supplemental content, based on the menu selections from FIGS. 3A and 3B, the content receiver 302C translates the text data into Russian and transmits the translated supplemental content as scrolling text 321C on the bottom third of the display screen 305C. With respect to the audio signals corresponding to the supplemental content, based on the menu selections from FIG. 3A, the content receiver 302C converts the supplemental content in the form of text data into audio signals and transmits the audio signals at 80% to one or more of the audio source 322C (such as speakers) communicatively coupled to the content receiver 302C or the audio source 323C provided by the content display device 304C. In FIG. 3C, the video content 324C is provided above the scrolling content 321C, but the position of the video content 324C relative to the supplemental content may be selected by the user, for example, using a pull down menu similar to the menus described above. The content receiver 302B may additionally provide an overlay of commands 325C (play, stop, pause, forward/reverse, fast forward/reverse) for controlling the presentation of the supplemental content, e.g., the scrolling text 321C on the content display device 304C. For example, the user may speed up or slow down the pace of the scrolling text 321C. Where the user has selected a static mode for viewing the supplemental content, the overlay of commands 325C may be utilized by the user 301C to page through or skip through the supplemental content. It will be appreciated that a number of various overlay commands may be provided in addition or as an alternative to the overlay commands 325C and may include chapter selections, menu selections (e.g., a command for presenting the menus depicted in FIGS. 3A and 3B), and the like.

In addition, with reference to FIG. 3C, the content receiver 302C may receive and transmit additional supplemental content 326C for display on the content display device 304C. The additional supplemental content may be received from the content provider or from an external source such as a website or another device communicatively coupled to the content receiver 302C. The additional supplemental content 326C is illustrated in FIG. 3C as static content, but it will be understood that the additional supplemental content 326C may be presented in any fashion, e.g., scrolling, static, and it will be understood that the additional supplemental content may be presented in the same or a different format compared to the supplemental content presented as scrolling content 321C. Moreover, the additional supplemental content 326C may be controlled by the user 303C as discussed above in connection with the menus illustrated in FIGS. 3A and 3B. For example, multiple sets of supplemental content may transmitted by the content receiver 302C to the content display device 304C, and for each set of supplemental content to be displayed, the user may select their preferences using the selections described above. Alternatively, the additional supplemental content 326C may be controlled by the content provider or another source. For example, when the content provider prefers to transmit advertising content as supplemental content, the content receiver 302C receives and transmits the supplemental content according to settings predefined by the content provider. The format of the supplemental content may be controlled by the content provider or by the external source based on metadata associated with the supplemental content designating the presentation of the additional supplemental content.

Although the example illustrated in connection with FIGS. 3A-3C relate to providing supplemental content from an external source connected to the data port 312C of the content receiver 302C, the supplemental content may be received from a variety of sources such as from the content provider and/or from the Internet. The source of the supplemental content is generally selected by the user 301A making selections from the supplemental content menu 309A based on the type of supplemental content the user 301A desires to view or hear. For example, when the user 301A selects e-mail as the supplemental content, the content receiver 302A executes instructions for requesting and receiving e-mail over the Internet from an e-mail account associated with the user 301A. In another example, when the user 301A selects local news as the supplemental content from the supplemental content menu 309A, the content receiver 302A executes instructions for requesting and receiving local news data from the content provider or from a communicatively coupled local news source, e.g., via the Internet. The selected supplemental content originating from the variety of sources is received by, and formatted and transmitted using, the content receiver 302A in the manner described above in relation to FIGS. 3A-3C. The options provided on the content menu 309A may be based on subscriptions offered to the user 301A by the content provider or another service provider communicatively coupled to the content receiver 302A. In another example, the content menu 309A may display items for selection that the user has already subscribed to. In this instance, other menu screens (not shown) may present subscription options for the user to select, which may include selection menu screens, terms of use screens, as well as payment screens. The options for supplemental content may have unique PIDs assigned thereto. A unique PID may be assigned when the supplemental content is not associated with a specific programming source, e.g., with a news channel. The user may select whether the supplemental content with the unique PID is displayed in connection with a programming channel or with a channel with a blank background by selecting a channel for the unique PID. When the user selects the channel with the associated PID, the supplemental content is displayed on the content display device 304C. Alternatively, the unique PID and a PID associated with a programming channel may be merged so that the supplemental content is displayed on the content display device 304C upon selection of the programming channel. In another example, the supplemental content may have a PID assigned that is associated with a PID for a specific programming source, e.g., with a news source. When the user selects the channel for the programming source, the supplemental content is displayed in addition to or as an alternative to the content from the programming source due to the matching PID.

The supplemental content received by the content receiver 302A-C may also be refreshed or parsed, e.g., differentiated in the manner described above in connection with FIG. 1 prior to transmitting the supplemental content to the display screen 305C.

According to the embodiments provided herein, the supplemental content transmitted by the content receiver 302C may be associated with a single channel or with multiple channels, e.g., depending on its assigned PID. For one channel, the user 301C may select one or more sets of supplemental content for display or audio transmission, while for another channel, the user 301C may select a different one or more sets of supplemental content for display or audio transmission. Furthermore, the user 301C may select to receive only audio supplemental content, only supplemental text content, or both audio and text content. When both the audio and text content are selected as supplemental content, the audio content may be the same or different from the text content. That is, when different audio and text supplemental content are selected, the user may select news supplemental content to be provided as audio content and select sports supplemental content to be provided as text content.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

It will be understood that while certain embodiments provide methods and systems for the content receiver to translate supplemental text data from one spoken language to another, any form of text data (e.g., text data provided as streaming content) may be translated to a different spoken language. Moreover, although the content receiver has been described as converting supplemental text content to audio signals, it will be understood that the content receiver 102 is configured to convert any form of text data (e.g., text data provided as streaming content) into audio signals.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The above disclosure may be provided as a computer program product, or software, that may include a data storage units provided as non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for providing supplemental content utilizing a set top box, the method comprising:
receiving a selection of a source at the set top box, the selection indicating an electronic mail source;
receiving supplemental data at the set top box from an electronic mail account associated with a user of the set top box, the supplemental data selected from the group consisting of text data, data translated from one human language to another, and data converted from text data to audio signals, the supplemental data received in addition to streaming content comprised of video content, audio content and metadata content, and the supplemental data is to be one of displayed on a content display device in addition to video content, displayed on the content display device as an alternative to video content, transmitted as audio signals in addition to the audio content and transmitted as audio signals as an alternative to the audio content;
determining, at the set top box, whether the supplemental content requires updating;
in response to determining that the supplemental content requires updating, transmitting a query from the set top box to a website and obtaining up-to-date content information;
updating, at the set top box, the supplemental content using the up-to-date content information;
formatting the supplemental data as supplemental content based on user preference information stored as metadata in the set top box, the supplemental content including supplemental audio content, and the formatting including adjusting a volume of the supplemental audio content based on the user preference information stored as metadata in the set top box that indicates a ratio of the volume of the supplemental audio content with respect to a volume of the audio content of the streaming content; and
transmitting the supplemental content from the set top box to the content display device.

2. The method of claim 1, wherein the supplemental data is parsed from the video content utilizing the set top box.

3. The method of claim 2, further comprising utilizing the set top box to retrieve updated supplemental data corresponding to the parsed data.

4. The method of claim 1, wherein the supplemental data is displayed simultaneously with the video content at a separate position on the content display device in relation to the video content, the separate position on the content display device in relation to the video content being based on the user preference information stored as metadata.

5. The method of claim 1, wherein the supplemental data is received at the set top box based on user selection data stored as metadata in the set top box.

6. The method of claim 1, wherein the received supplemental data comprises a process identifier for transmitting the supplemental content to the content display device upon selection of a channel associated with the process identifier.

7. The method of claim 6, wherein the process identifier comprises identification information unique to the supplemental data.

8. The method of claim 1, further comprising receiving additional supplemental data at the set top box; and utilizing the set top box to format the additional supplemental data as supplemental content based on information from a content provider.

9. The method of claim 8, wherein the additional supplemental content is transmitted to the content display device;

and the additional supplemental content is displayed at a separate position on the content display device in relation to the supplemental content formatted based on the user preference information.

10. The method of claim 1, further comprising utilizing the set top box to retrieve updated data corresponding to the received supplemental data.

11. The method of claim 1, wherein:
the data is received in a first human language; and
the operation of formatting comprises utilizing the set top box to translate the data into a second human language different from the first human language.

12. The method of claim 11, wherein:
the operation of formatting comprises utilizing the set top box to convert the translated data into audio signals; and
the operation of transmitting comprises utilizing the set top box to transmit the audio signals.

13. The method of claim 1, wherein:
the operation of formatting comprises utilizing the set top box to convert the supplemental content into audio signals, and transmitting comprises utilizing the set top box to transmit the audio signals.

14. A method for providing translated data utilizing a set top box, the method comprising:
receiving at the set top box streaming content including video data and audio data;
receiving a selection of a source at the set top box, the selection indicating an electronic mail source;
receiving data corresponding to at least one human language at the set top box from an electronic mail account associated with a user of the set top box;
determining, at the set top box, whether the data requires updating;
in response to determining that the data requires updating, transmitting a query from the set top box to a website and obtaining up-to-date content data;
updating, at the set top box, the data using the up-to-date content data; and
utilizing the set top box to translate the data to a format corresponding to a second human language different from the at least one human language, wherein the data is translated based on user preference information stored within the set top box, and wherein the translated data includes translated audio data;
adjusting a volume of the translated audio data based on the user preference information stored within the set top box that indicates a ratio of the volume of the translated audio data with respect to a volume of the audio data of the streaming content; and
transmitting the translated data to a content display device for visual display.

15. The method of claim 14, wherein the set top box executes instructions for requesting and retrieving translated data from an external source.

16. The method of claim 14, further comprising utilizing the set top box to convert the translated data into audio signals and transmitting the audio signals to an audio source configured to provide audibly perceptible sound signals.

17. The method of claim 14, further comprising utilizing the set top box to retrieve updated data corresponding to the translated data.

* * * * *